(12) United States Patent
Kogure et al.

(10) Patent No.: US 7,081,588 B2
(45) Date of Patent: Jul. 25, 2006

(54) ELECTRIC POWER SUPPLYING DEVICE

(75) Inventors: Naoto Kogure, Shizuoka (JP); Osamu Sano, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/874,353

(22) Filed: Jun. 24, 2004

(65) Prior Publication Data

US 2005/0000718 A1    Jan. 6, 2005

(30) Foreign Application Priority Data

Jun. 26, 2003   (JP) ............................. 2003-182553

(51) Int. Cl.
*H02G 1/00*    (2006.01)

(52) U.S. Cl. .................. 174/72 A; 174/72 C; 174/75 F

(58) Field of Classification Search .............. 174/72 A, 174/72 C, 75 F
See application file for complete search history.

(56) References Cited

U.S. PATENT DOCUMENTS 5,069,000 A * 12/1991 Zuckerman ................... 49/28
5,877,936 A * 3/1999 Nishitani et al. ........... 361/600
6,492,592 B1* 12/2002 Murofushi et al. ......... 174/72 A
6,787,702 B1* 9/2004 Suzuki ...................... 174/72 A

FOREIGN PATENT DOCUMENTS

| JP | 9-20189 | 1/1997 |
| JP | 2001-128348 | 5/2001 |
| JP | 2001-354085 | 12/2001 |

* cited by examiner

Primary Examiner—Jinhee Lee
(74) Attorney, Agent, or Firm—Armstrong, Kratz, Quintos, Hanson & Brooks, LLP

(57) ABSTRACT

A electric power supplying device includes a protector for receiving a wire harness curved in a loop, a first harness guide disposed opposite to a slack of the wire harness in the protector, and an outlet arranged nearer the slack of the wire harness than the first harness guide. The harness guide is curved in the loop from the first harness guide, and the loop is led outward from the outlet. Further, a second harness guide is provided movably in a radial direction of the loop, arranged nearer the harness slack than the first harness guide. An energizing means forces the second harness guide in a direction increasing a diameter of the loop. At least one of the first and second harness guides is a rotatable guide roller. The second harness guide is movable along an elongated guiding member formed on the protector.

5 Claims, 5 Drawing Sheets

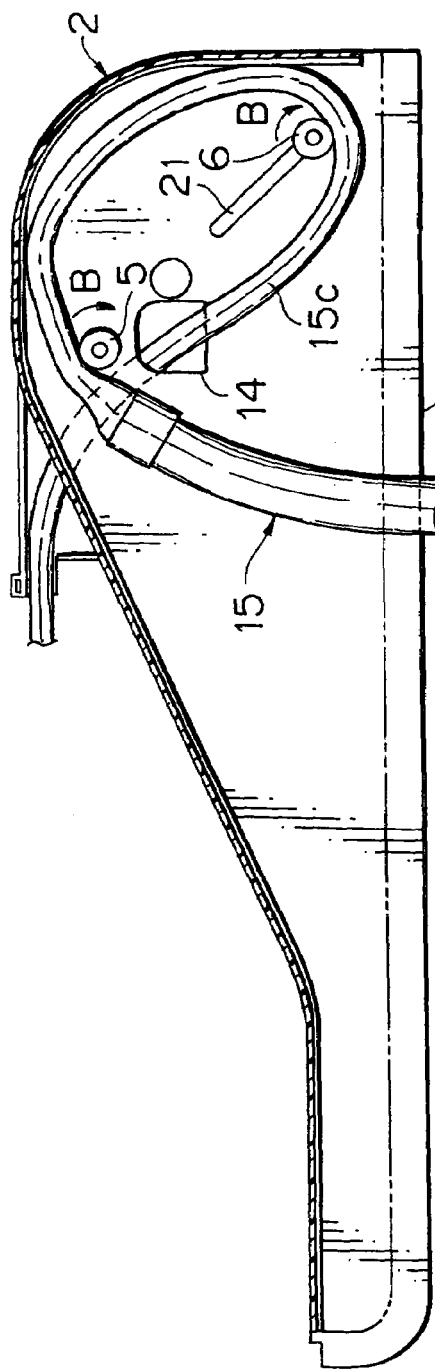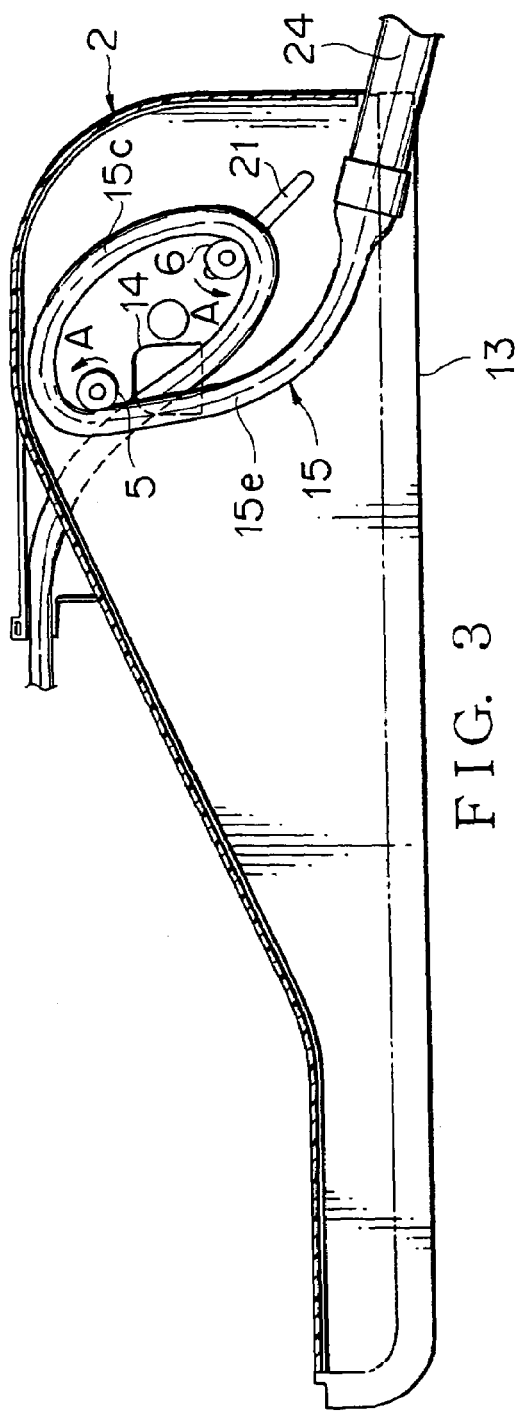
FIG. 2
FIG. 3

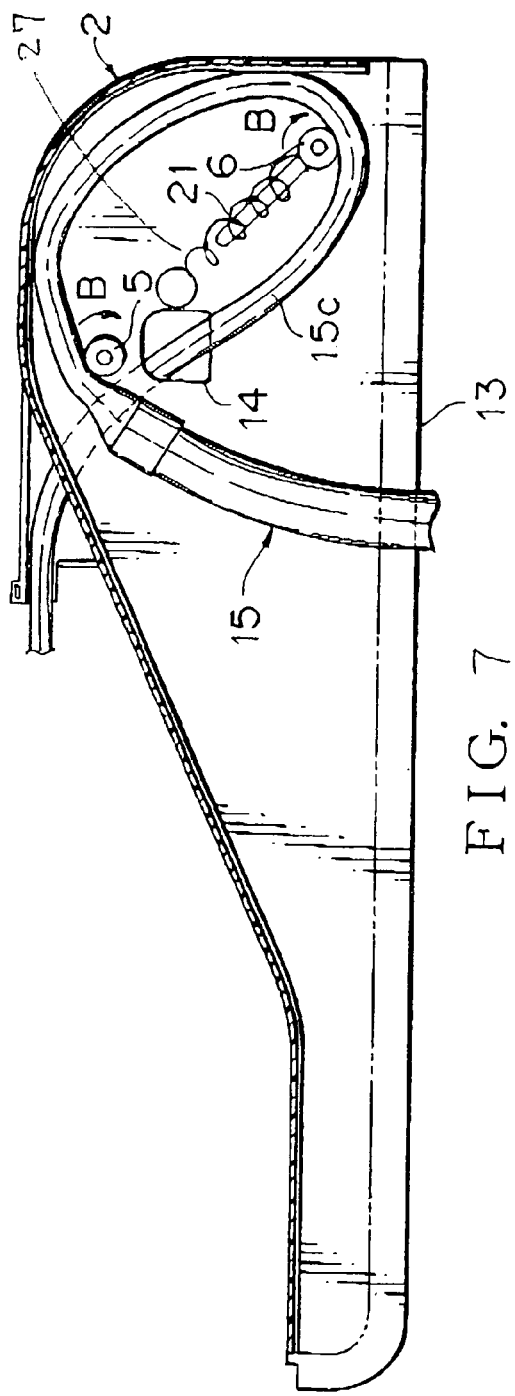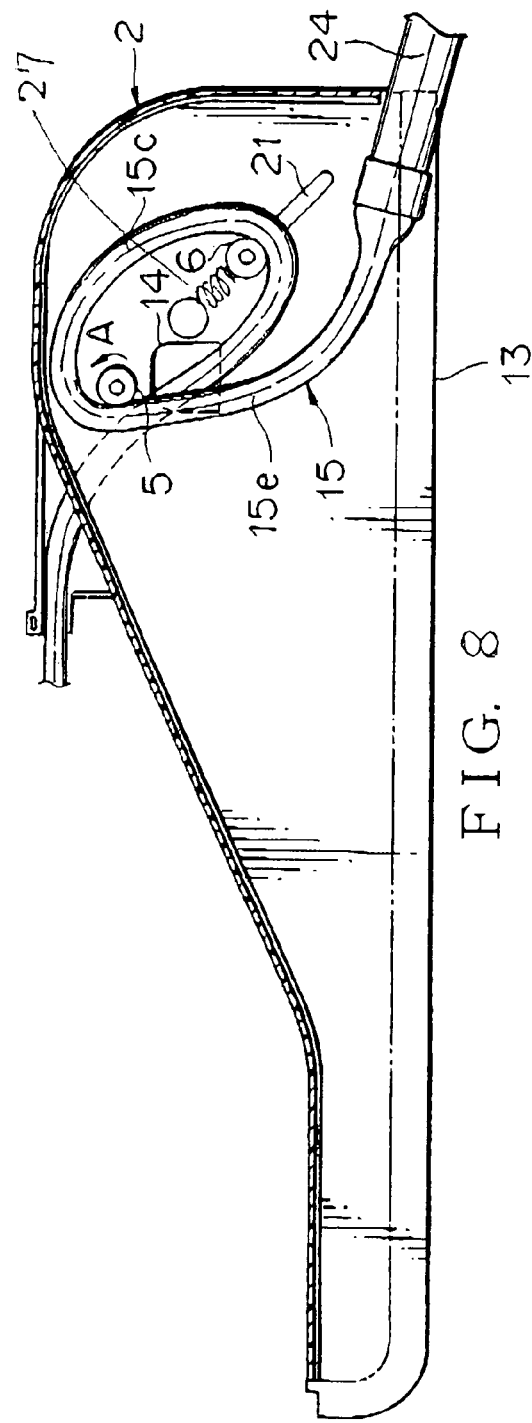

ELECTRIC POWER SUPPLYING DEVICE

FIELD OF THE INVENTION

This invention relates to an electric power supplying device for use in a vehicle and the like to continuously supply electric power from a vehicle body to auxiliaries at a sliding door.

DESCRIPTION OF THE RELATED ART

FIGS. 4 to 5 show one embodiment of the conventional electric power supplying device (for example, Japanese Patent Application Laid-Open No. 2001-354085, page 7 to 9, FIGS. 4 to 7).

This electric power supplying device 40 is mounted on a sliding door 41, having a protector 42, and a metallic flat spring 44. Said protector 42 includes a base and cover (not shown) made of synthetic resin for receiving a wire harness 43. Said flat spring 44 is assembled in the protector to force the wire harness 43 upward.

The protector 42 includes a substantially semicircular part and an elongated extending part continued thereto for receiving the wire harness 43. Namely, the protector 42 includes a vertical substrate 49, a peripheral wall 50, a bottom opening 45 and a front opening 51.

The protector 42 is vertically arranged between a metallic door panel 52 and a door trim made of synthetic resin (not shown). The wire harness 43 is curved horizontally at the bottom opening 45 and routed in a vehicle body 47. Further, the wire harness 43 is fixed around a step 48 (not shown) and routed through a front opening 51 into the sliding door. Further, the wire harness 43 is connected to the auxiliaries at the sliding door or another harness with a connector. Thus, electric power is supplied continuously.

The wire harness 43 is made of a flexible corrugate tube made of synthetic resin, covering a plurality of electric wires. The corrugate tube is formed by arranging projecting rings and grooves alternately, and continued from the front opening 51 of the protector 42 to a harness holder in the vehicle body 47.

When the sliding door 41 is almost closed, the wire harness 43 is pulled backward, while the flat spring 44 is slightly curved downward. When the sliding door 41 is half opened, a large slack of the wire harness 43 is absorbed by the flat spring 44 energizing the wire harness 43 upward. When the sliding door 41 is fully opened, the wire harness 43 is pulled forward, while the flat spring 44 is curved downward.

However, in a structure of the conventional device, a slack is absorbed by lifting the wire harness 43 with the flat spring 44. Therefore, if an open/close stroke of the sliding door 41 is large, a height of the protector 42 should be large. Therefore, there is a problem that a space for arranging other components or auxiliaries in the sliding door becomes small. Further, since the metallic flat spring 44a, and a bracket for fixing the flat spring 44, and the like is needed, the device cost becomes higher. Further, many labor hours are needed to fix the flat spring 44.

This invention has been accomplished to solve the above-described problems and an object of this invention is to provide an electric power supplying device for preventing an enlarged protector, having a simple structure so as to be assembled easily.

SUMMARY OF THE INVENTION

In order to attain the object, according to this invention, there is provided an electric power supplying device comprising:

a protector for receiving a wire harness curved in a loop;

a first harness guide provided opposite to a harness slack of the wire harness in the protector; and a harness outlet provided closer to the harness slack than the first harness guide, whereby one side of the loop of the wire harness abuts on the first harness guide, and is led out from the harness outlet.

According to above, by increasing a diameter of the loop of the wire harness in the protector, the slack of the wire harness is absorbed. Further, by leading out the wire harness from the protector, the diameter of the loop is decreased. Since the first harness guide arranged opposed to the harness slack supports a top end of the loop, a position of the loop is regulated. Further, since one side of the loop is led outside from the outlet nearer the harness slack than the harness guide, the wire harness is prevented from forming loops overlapping each other in a thickness direction of the protector, and the diameter of the loop is increased and decreased smoothly without any catch, so that the protector can become slimmer. The other side of the loop is led out through the protector from the bottom opening.

Suppose that this electric power supplying device is applied to a vehicle. When the sliding door is fully closed, the wire harness is pulled backward and the diameter of the loop is decreased. When the sliding door is half opened, the diameter of the loop is increased by such as spring force (resiliency) of the wire harness to pull the wire harness into the protector, and absorb the slack. When the sliding door is fully opened, the wire harness is pulled forward, and the diameter of the loop is decreased again.

According to above, since the diameter of the loop can be increased or decreased by the resiliency of the wire harness instead of conventional flat spring, a total height of the protector can be lower than that of the conventional protector. Therefore, other components can be arranged more flexible in a wider space in the sliding door of the vehicle. Further, since the outlet, from which the loop of the wire harness is led outward, is provided closer to the slack of the wire harness than the harness guide, the wire harness is prevented from forming loops overlapping each other in a thickness direction of the protector, and the slack can be absorbed efficiently. Thus, reliability of the continuous electric power supply in a vehicle sliding door is improved. Further, the protector can become slimmer, so that the sliding door can become slimmer.

Preferably, according to this invention, there is provided the electric power supplying device further comprising a second harness guide, wherein said second harness guide is provided movably in a radial direction of the loop of the wire harness, and closer to the harness slack than the first harness guide.

According to this structure, a pair of harness guides face to each other, and the loop is arranged outside the pair of harness guides. When the diameter of the loop is increased, the second harness guide moves away from the first harness guide. When the diameter of the loop is decreased, the second harness guide approaches the first harness guide. Therefore, a shape of the loop is kept in a partial circle (substantially perfect partial circle), and absorbability of the slack is improved.

According to above, one harness guide supports around the top of the loop of the wire harness, while the other harness guide moves forward or backward, thereby the loop is held in a substantially perfect partial circle. Thus, the absorbability of the slack of the wire harness is improved, and the reliability of the continuous electric power supply in the sliding door is improved.

Preferably, according to this invention, there is provided the electric power supplying device further comprising an energizing means, wherein said energizing means forces the second harness guide in a direction of increasing a diameter of the loop of the wire harness.

According to this structure, since the diameter of the loop of the wire harness is forcibly increased by the energizing means, a drawing force for leading the wire harness inside the protector is improved, and the absorbability of the slack is improved. Further, even if resiliency of the wire harness is reduced and the loop becomes more flexible, this device still has enough absorbability of the harness slack. Therefore, a coating of the wire harness can become thinner, and the protector can become slimmer.

When the sliding door is fully closed, the wire harness is pulled backward, and the diameter of the loop is decreased to move the second harness guide toward the first harness guide against the energizing force. When the sliding door is half opened, the energizing means moves the second harness guide outward to forcibly increase the diameter of the loop and absorb the slack. When the sliding door is fully opened, the wire harness is pulled forward, and the diameter of the loop is decreased to move the second harness guide toward the first harness guide against the energizing force.

Preferably, according to this invention, there is provided the electric power supplying device, wherein at least one of said first and second harness guides is a rotatable guide roller.

According to this structure, since at least one of the harness guides is rotated by sliding friction, the wire harness has no need to slide on said at least one harness guide against said friction, so that the circular loop is formed smoothly. Each harness guide is rotated opposite directions according to whether the diameter of the loop is increased or decreased. Normally, both harness guides are rotated in the same direction.

According to above, since at least one of the harness guides is rotated, the wire harness is prevented from sliding on said at least one harness guide. Therefore, the diameter of the loop can be smoothly increased or decreased, so that the reliability of the continuous electric power supply is improved.

Preferably, according to this invention, there is provided the electric power supplying device, wherein said second harness guide is movable along an elongated guiding part being formed on the protector.

According to this structure, the second harness guide slides along the elongated guiding part to increase or decrease the diameter of the loop of the wire harness. When the sliding door is fully opened or closed and the diameter of the loop is decreased, the second harness guide slides along the elongated guiding part of the protector to approach the first harness guide. When the sliding door is half opened and the diameter of the loop is increased, the second harness guide slides along the elongated guiding part of the protector to move away from the first harness guide. The guiding part of the protector is not limited to have a straight shape.

According to above, since the second harness guide is regulated to move smoothly along the elongated guiding part, the slack of the wire harness is absorbed smoothly and the reliability of the continuous electric power supply is improved.

Preferably, according to this invention, there is provided the electric power supplying device, wherein said first harness guide is located around a top of the loop of the wire harness.

According to this structure, when the protector is disposed vertically, the first harness guide supports a vicinity of the top of the loop to allow the diameter of the loop to be increased or decreased, while said loop having a substantially perfect circular shape.

One part of the loop is led outside at a lower side of the loop through the harness outlet.

According to above, since the first harness guide supports the loop to allow the diameter of the loop to be increased or decreased, while said loop having a substantially perfect circular shape, the absorbability of the slack of the wire harness is improved. (The absorbability of the slack of the wire harness having a perfect circular loop is higher than that having an ellipse loop.) Therefore, the reliability of the continuous electric power supply is improved, and the protector can become slimmer.

Preferably, according to this invention, there is provided the electric power supplying device, wherein said harness outlet communicates with a back side of the protector.

According to this structure, said one part of the loop is led out to the back side of the protector, and the other part of the loop is supported by the first harness guide, and moved to be curved outward in a radial direction of the loop of the wire harness, so that the wire harness has a partial double loop in the radial direction of the loop. Thus, the loop is not doubled (overlapped) in the thickness direction of the protector, so that the protector can become slimmer.

According to above, since the loop is not doubled (overlapped) in the thickness direction of the protector and the protector can become slimmer, the sliding door can be slimmer, and comfortability of passengers is improved.

BRIEF DESCRIPTION OF THE DRAWINGS

FIG. 2 is a front view of a half opened sliding door of the electric power supplying device;

FIG. 3 is a front view of a fully opened sliding door of the electric power supplying device;

FIG. 7 is a view similar to FIG. 2 showing use of a spring as an energizing member; and FIG. 8 is a view similar to FIG. 3 showing use of a spring as an energizing member.

DESCRIPTION OF THE PREFERRED EMBODIMENT

One embodiment of an electric power supplying device according to this invention will now be described with reference to FIGS. 1 to 3.

Figure 1:
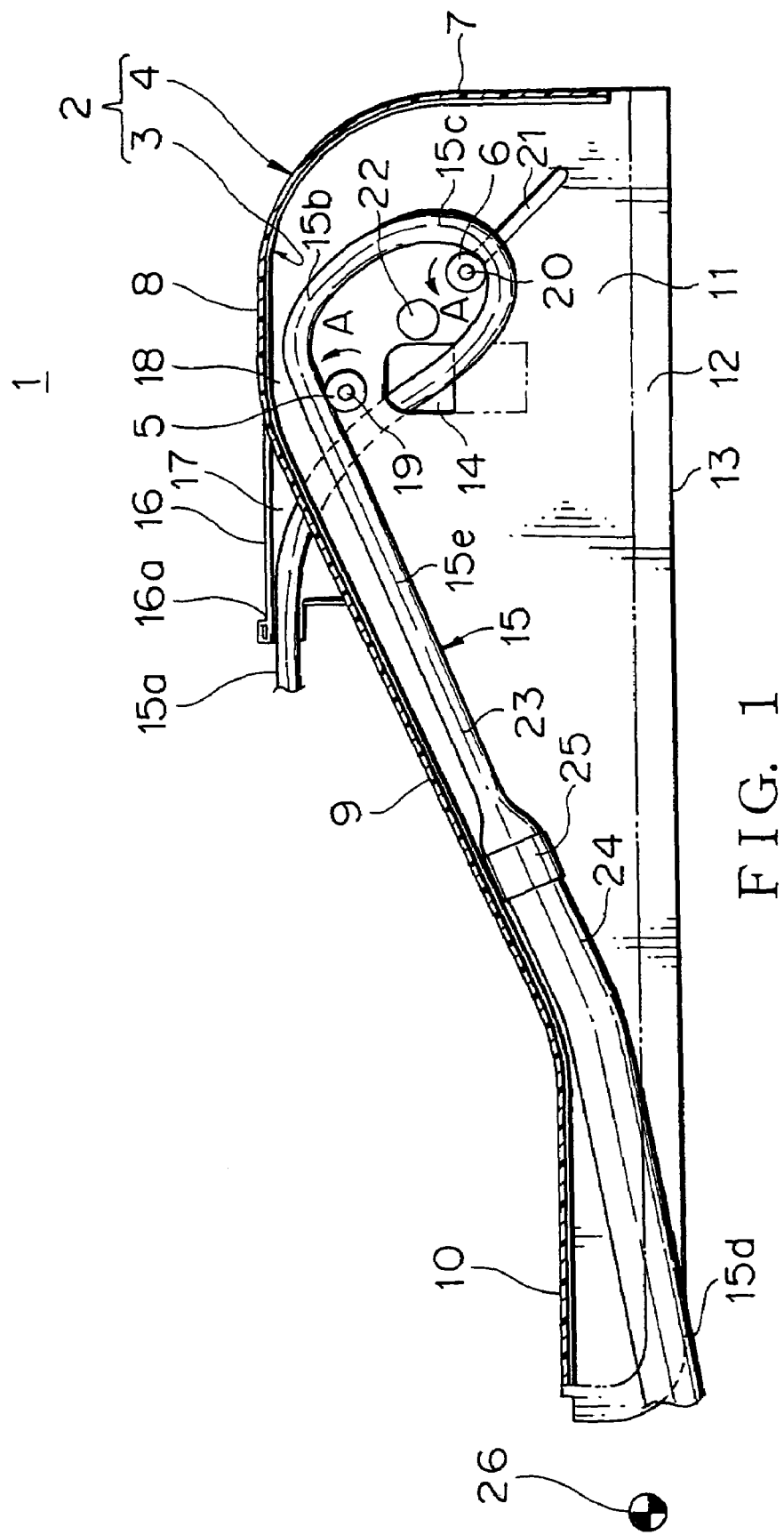
FIG. 1 is a front view of a fully closed sliding door showing one embodiment of an electric power supplying device according to this invention.
Figure 4:
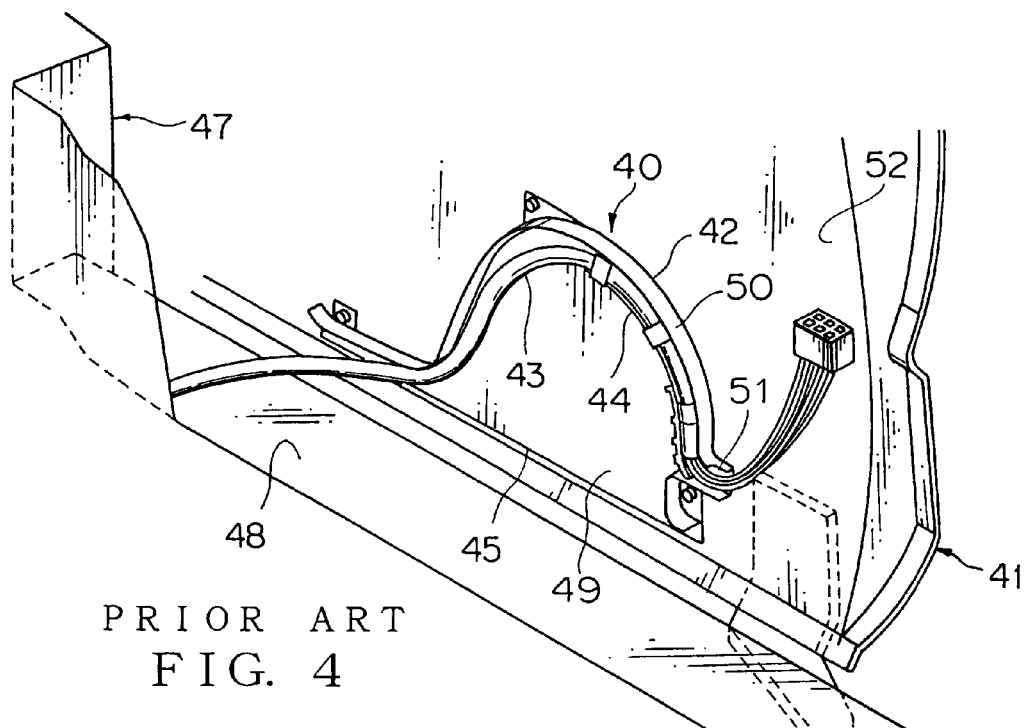
FIG. 4 is a perspective view of an almost closed sliding door showing one embodiment of a conventional electric power supplying device.
Figure 5:
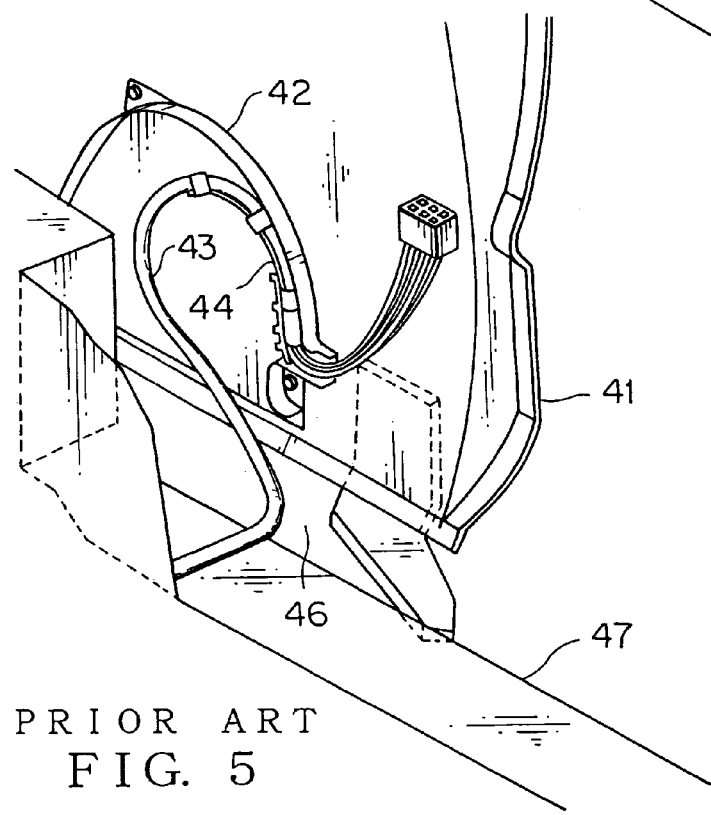
FIG. 5 is a perspective view of an almost opened sliding door of the conventional electric power supplying device.
Figure 6:
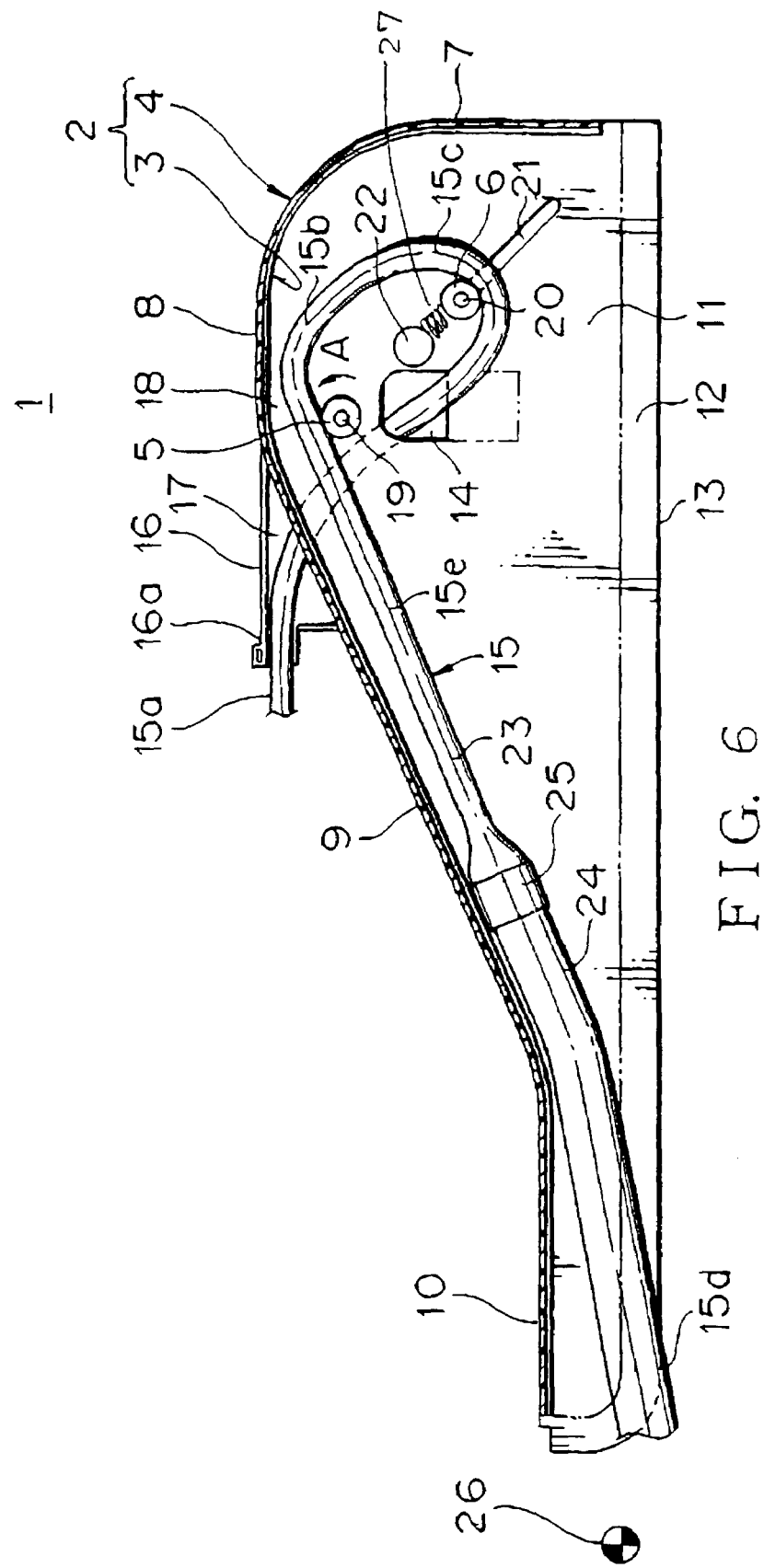
FIG. 6 is a view similar to FIG. 1 showing use of a spring as an energizing member.

FIG. 1 shows a fully closed sliding door of a vehicle. FIG. 2 shows a half opened sliding door. FIG. 3 shows a fully opened sliding door.

As shown in FIG. 1, an electric power supplying device 1 includes a protector 2 made of synthetic resin; a first guide roller 5 (harness guide) provided movably on an upper side of the protector 2, being made of synthetic resin; a second guide roller 6 (harness guide) facing to the first guide roller 5, being provided on a front side of the protector 2 at a lower front of the first guide roller 5, being rotatable and diagonally movable; and a resilient member, such as a spring 27, for energizing the second guide roller 6 obliquely downward.

Like conventional electric power supplying devices, the protector 2 includes a base 3 and a cover 4. The protector 2 is designed to be substantially half the height of a conventional protector. Namely, while a harness receiving part of the conventional protector is formed in a substantially semicircular shape, the harness receiving part of the protector of this invention is formed compact and low, including peripheral walls consisting of a short vertical front end wall 7; a short horizontal ceiling wall 8 continued from a top end of the wall 7 to a curved wall; a long oblique substantially straight wall 9 continued downward from the curved wall; and a short horizontal wall 10 extending from the oblique wall 9, and a vertical landscape substrate 11 perpendicular to said peripheral walls. A horizontal length of the protector 2 is substantially the same as that of the conventional protector.

FIGS. 1 to 3 show the peripheral walls as parts of the cover 4, and a harness guiding wall 12 provided at the bottom of the electric power supplying device 1, having a skirt-like shape, and curved outward from the supplying device 1. An elongated opening 13 for leading out the wire harness is provided between bottom ends of the base 3 and the harness guiding wall 12 of the cover 4. This manner is the same as that of the conventional device.

The substrate 11 of the base 3 is in contact with a metallic door panel of the sliding door. An outlet 14 for leading out the wire harness is formed by notching on the substrate 11 at a middle of the pair of guide rollers 5, 6 in a vertical direction. Both a square opening as shown by a solid line in FIG. 1, and a rectangular opening as shown by a two-dot chain line are acceptable as a the outlet 14. The outlet 14 regulates a position of a part of the wire harness. The outlet 14 is provided near and under the first guide roller 5.

The wire harness 15 is received inside the protector 2, by bending in a loop shape around the first guide roller 5 and the second guide roller 6, and led outside from the outlet 14 to the back side of the base 3.

Preferably, as shown in FIG. 1, a wire harness exit port 16 is formed integrally with the base 3 at the back side thereof, for example, projecting outward therefrom. The wire harness exit port 16 includes a harness receiving groove or a harness receiving space 17 inside thereof. The wire harness 15 is fixed to a distal end 16a of the wire harness exit port 16 by winding a tape or a band. An outer part 15a of the wire harness led out from the wire harness exit port 16 is connected to another wire harness or an auxiliary (for example, a power window motor, a door lock, a switch unit, or a speaker).

In addition, the outer part 15a of the wire harness led out from the outlet 14 can be received and fixed directly into a groove of the door panel without providing the wire harness exit port 16. As shown in FIGS. 1 to 3, since the outer part 15a of the wire harness is led backward laterally, a space provided above the protector 2 can be used effectively as an accommodation room for other components in the sliding door.

The first guide roller 5 is located above the outlet 14. A passing space 18 for passing the wire harness is formed between the first guide roller 5 and the upper peripheral wall of the protector 2. The first guide roller 5 is disposed below the horizontal ceiling wall 8. The first guide roller 5 may be disposed near a center of the ceiling wall 8 to be vertically aligned with a top 15b of the loop. Preferably, an axis 19 of the first guide roller 5 is engaged rotatably with holes (not shown) in the base 3 and in the cover 4.

The second guide roller 6 is located substantially on a line joining the first guide roller 5 and a bottom front end of the protector 2. A straight elongated guiding hole 21 in a slit-like shape is provided on said line on the substrate 11 of the base 3. An axis 20 of the second guide roller 6 is engaged with the guiding hole 21, slidably in a longitudinal direction thereof. Preferably, another guiding hole 21 is provided on the cover 4, facing to the guiding hole 21 on the base 3, and the axis 20 of the second guide roller 6 is slidably and rotatably engaged with both guiding holes 21. A supporting manner of each axis of the guide rollers 5, 6 is not limited to above structure. Shapes of the axes 19,20, integration or separation of the axes 19, 20 and the guide rollers 5, 6 respectively, using a bearing between the axis and the guide roller or not, and the like, may be modified as necessary.

A length of the guiding hole 21 is designed suitably according to a length of the slack of the wire harness 15 to be absorbed. Preferably, a minimum clearance between the guide rollers 5, 6 is designed so that the wire harness 15 can be looped smoothly. In FIG. 1, a reference numeral 22 indicates a hole for fixing the protector 2 to the door panel.

The second guide roller 6 is forced in a direction of increasing the diameter of a loop 15c of the wire harness 15 with a resilient member (energizing means) such as a helical extension spring, helical compression spring, a flat spring, a rubber member and the like. For example, one end of the helical extension spring is seized at the bottom front end of the protector 2, the other end of said spring is seized at the axis 20 of the second guide roller 6. For another example, one end of the helical compression. spring is supported by a projection (not shown) projecting from the substrate 11, and the other end of the helical compression spring forces the axis 20 of the second guide roller 6. For another example, one end of the flat spring is fixed to the protector 2, and the other end of the flat spring forces the axis 20 of the second guide roller 6 without interfering with the wire harness 15. For the other example, one end of the rubber member, such as a rubber band, is seized at the bottom front end of the protector 2, and the other end of the rubber member is seized at the axis 20 of the second guide roller 6.

The second guide roller 6 may be forced by its own weight (for example, using a metallic large guide roller), a weight or the like, in a direction of increasing the diameter of the loop, in addition to said resilient members. Outer diameters of the first and second guide rollers 5,6 are not limited to those small ones in FIGS. 1 to 3, and may be larger unless interfering with other guide roller or the wire harness 15.

Since the wire harness 15 is curved in a loop along the guide rollers 5, 6 and led outside from the outlet 14 disposed below the bottom of the first guide roller 5, the wire harness 15 is prevented from overlapping in a thickness direction of the protector, so that the protector 2 may have a slim shape.

In the wire harness 15, a flexible mesh tube 23 made of synthetic resin, covers a plurality of electric wires with insulating coating for increasing the flexibility of the loop 15c of the wire harness 15. This flexible tube 23 is used around the wire harness exit port 16, and communicates with a conventional corrugate tube 24 made of synthetic resin. Said corrugate tube 24 covers a lower part 15d of the wire harness 15 along the harness guiding wall 12, said harness guiding wall 12 is disposed at an edge of a bottom opening 13, having a curved section. Preferably, the corrugate tube 24 has an ellipse section, a long side of which is arranged vertically to allow the protector 2 to become slimmer. A joining member, such as an adhesive tape, joins the ends of the flexible tube 23 and the corrugate tube 24 together.

An operation of the electric power supplying device 1 will be explained below.

When the sliding door is fully closed as shown in FIG. 1, the wire harness 15, which passes out to the vehicle body from a rear side of the bottom opening 13 of the protector 2, is pulled backward using a harness holder 26 as a supporting point. A center of the harness holder 26 is shown with a mark in FIG. 1. Therefore, the diameter of the loop 15c of the wire harness 15 is decreased to be the minimum. The harness holder 26 holds the wire harness 15 rotatably in its circumferential direction and prevents the wire harness 15 from moving in its axis direction to cancel a twist of the wire harness 15 conventionally.

The wire harness 15 is led out from the outlet 14 obliquely upward to the back side of the protector 2, and intersects a slope 15e of the wire harness 15 through the substrate 11 of the base 3. Therefore, some parts of the loop 15c of the wire harness 15 are prevented from overlapping with each other in the thickness direction of the wire harness 15. The second guide roller 6 is disposed at the top of the guiding hole 21. When the sliding door is almost closed, the guide rollers 5, 6 are rotated counter clockwise, as shown with an arrow A in FIG. 1, as the wire harness 15 is moved backward to the vehicle body.

While the sliding door is moved from being fully closed as shown in FIG. 1 to be half opened as shown in FIG. 2, the wire harness 15 is about to slacken off in a space between the sliding door and the vehicle body. However, the second guide roller 6 is moved downward along the guiding hole 21 by the energizing means to increase the diameter of the loop 15c of the wire harness 15 and absorb the slack of the wire harness 15 in the protector 2. Thus, at this moment, the second guide roller 6 is disposed at a lower end of the guiding hole 21, and the harness holder 26 is in a middle of the longitudinal direction of the protector 2.

While the sliding door is moved from being fully closed as shown in FIG. 1 to being half opened as shown in FIG. 2, the guide rollers 5, 6 are rotated clockwise as shown with an arrow B in FIG. 2, as the wire harness 15 is led out from the bottom opening 13 to the inside of the protector 2. These guide rollers 5, 6 are rotated by the friction between said guide rollers and an outer surface of the wire harness 15. Since the guide rollers 5, 6 are rotated, the outer surface of the wire harness 15 has no need to slide on surfaces of said guide rollers 5, 6 against said friction, so that the harness slack can be absorbed smoothly.

While the sliding door is moved from being half opened as shown in FIG. 2 to being fully opened as shown in FIG. 3, the wire harness 15 is pulled forward from the bottom opening 13 of the protector 2 using the harness holder 26 as a supporting point. At this moment, the harness holder 26 is located in front of the protector 2. The diameter of the loop 15c of the wire harness 15 is decreased as the guide rollers 5, 6 are rotated counter clockwise as shown with an arrow A in FIG. 3. The second guide roller 6 is moved upward along the guiding hole 21 to be located around the top of the guiding hole 21.

As shown in FIG. 3, the part 15e of the wire harness 15 is curved along an outer left side of the loop 15c of the wire harness 15 to form a partial double loop. The corrugate tube 24 continued to the part 15e is pulled out from a front end of the bottom opening 13. As shown in FIGS. 1 to 3, the corrugate tube 24 is swung forward along the bottom opening 13.

While the sliding door is moved from being fully opened as shown in FIG. 3 to being half closed as shown in FIG. 2, as the diameter of the loop 15c of the wire harness 15 is increased, the guide rollers 5, 6 are rotated clockwise as shown with the arrow B in FIG. 2. While the sliding door is moved from being half closed in FIG. 2 to being fully closed in FIG. 1, as the diameter of the loop 15c of the wire harness 15 is decreased, the guide rollers 5, 6 are rotated counter clockwise as shown with the arrow A in FIG. 1.

In addition, a general information of the operations concerning the guide rollers 5, 6 are described above. Actually, when the sliding door is half open and the wire harness 15 is being moved, the first guide roller 5 may be stopped. Further, when the guide roller 5 is stopped, the second guide roller 6 may be solely rotated by the energizing force of the energizing member. Further, the guide rollers 5, 6 may be temporary rotated in opposite directions to each other.

Further, if the outer part 15a of the wire harness 15 is led out upward in a vertical direction from the outlet 14, instead of obliquely upward, the loop 15c of the wire harness 15 is curved in a more perfect circle at the half opening of the sliding door in FIG. 2. The more perfect circle of the loop 15c is rather preferable for absolving the harness slack.

In the embodiment described above, the second guide roller 6 and the energizing member force the wire harness 15 in a direction increasing the diameter of the loop. However, for example, if the loop 15c is coated by a resilient corrugate tube instead of the flexible mesh tube 23, or using electric wires with resilient insulating coating, the loop 15 is formed easier, so that the slack can be absorbed to some degree without the second guide roller 6 and the energizing means. Further, when the loop is formed by a flexible tube, and the second guide roller 6 is forced by its own weight without other energizing members, the slack can be absorbed to some degree.

Further, in the above embodiment, the guide roller 5, 6 are supported rotatably by the axes 19, 20 respectively. However, when the friction between the outer surface of the wire harness 15 and the outer surfaces of the guide rollers 5, 6 is extremely small, depending on their materials, the guide rollers may have no need to rotate. Further, the guiding hole 21 as a guiding member can be replaced with a guiding groove or a guiding projection. Said guiding projection may be engaged slidably with an unrotatable second guide roller (harness guide). Further, the guiding hole 21 may be curved, instead of straight.

Further, the shape of the protector 2 can be circular, instead of landscape, so that the protector 2 may be rotated instead of the wire harness 15 being swung. Further, the wire harness 15 can be pulled out (expanded and contracted) in just one direction instead of the circular protector being rotated, or the wire harness being swung.

Further, in the embodiment described above, the electric power supplying device 1 is mounted on the sliding door of the vehicle. However, the electric power supplying device 1 may be mounted laterally on the vehicle body instead of the sliding door. Further, the electric power supplying device 1 may be mounted vertically or laterally on the sliding sheet. Further, the electric power supplying device 1 may be mounted on a sliding door of other applications, instead of a vehicle.

What is claimed is:

1. An electric power supplying device comprising:
   a protector for receiving a wire harness curved in a loop;
   the protector having a vertical substrate and peripheral walls;
   a first harness guide provided on the vertical substrate opposite to a harness slack of the wire harness in the protector;
   a second harness guide provided on the vertical substrate:
   an energizing means provided on said second harness guide: and
   a harness outlet in the vertical substrate provided closer to the harness slack than the first harness guide; wherein
   said first harness guide is adjacent to and above the harness outlet, and one side of the loop of the wire harness abuts on the first harness guide and is led out from the harness outlet;
   said second harness guide is provided movably in a radial direction of the loop of the wire harness, and closer to the harness slack than the first harness guide; and
   said energizing means forces the second harness guide in a direction to increase a diameter of the loop of the wire harness.

2. The electric power supplying device as claimed in claim 1, wherein at least one of said first and second harness guides is a rotatable guide roller.

3. The electric power supplying device as claimed in claim 1, wherein said second harness guide is movable along an elongated guiding part formed on the protector.

4. The electric power supplying device as claimed in claim 1, wherein said first harness guide is located around a top of the loop of the wire harness.

5. The electric power supplying device as claimed in claim 1, wherein said harness outlet communicates with a back side of the protector.

* * * * *